(12) United States Patent
Son et al.

(10) Patent No.: US 12,546,617 B2
(45) Date of Patent: Feb. 10, 2026

(54) APPARATUS FOR SEARCHING FOR AN OPTIMAL ROUTE BASED ON AN ENTIRE ROUTE AND A METHOD THEREOF

(71) Applicant: HYUNDAI AUTOEVER CORP., Seoul (KR)

(72) Inventors: SangKyu Son, Seoul (KR); JeongHun Lee, Seoul (KR); WooSun Chon, Seoul (KR); Delphine, Seoul (KR); Minoh Heo, Seoul (KR)

(73) Assignee: HYUNDAI AUTOEVER CORP., Seoul (KR)

( * ) Notice: Subject to any disclaimer, the term of this patent is extended or adjusted under 35 U.S.C. 154(b) by 104 days.

(21) Appl. No.: 18/539,608

(22) Filed: Dec. 14, 2023

(65) Prior Publication Data

US 2024/0210192 A1  Jun. 27, 2024

(30) Foreign Application Priority Data

Dec. 23, 2022 (KR) ........................ 10-2022-0182567

(51) Int. Cl.
*G01C 21/34* (2006.01)
*G01C 21/00* (2006.01)

(52) U.S. Cl.
CPC ..... *G01C 21/3492* (2013.01); *G01C 21/3881* (2020.08)

(58) Field of Classification Search
CPC .. G01C 21/34; G01C 21/343; G01C 21/3446; G01C 21/3492; G01C 21/3881; G01C 19/42; G06N 3/08; G06Q 50/40

(Continued)

(56) References Cited

U.S. PATENT DOCUMENTS 10,769,712 B1 * 9/2020 Edwards ............ G06Q 10/1093
10,921,147 B1 * 2/2021 Hapgood ........... G01C 21/3484
(Continued)

FOREIGN PATENT DOCUMENTS

CN     110753382 A  *  2/2020  ............ H04W 40/22
CN     119618252 A  *  3/2025  ............ G06Q 10/083
(Continued)

OTHER PUBLICATIONS

Fagan, et al., "Intelligent time of arrival estimation," 2011 IEEE Forum on Integrated and Sustainable Transportation Systems, Vienna, Austria, 2011, pp. 60-66, doi: 10.1109/FISTS.2011.5973595. (https://ieeexplore.ieee.org/document/5973595) (Year: 2011).*

(Continued)

*Primary Examiner* — Atul Trivedi
(74) *Attorney, Agent, or Firm* — Lempia Summerfield Katz LLC

(57) ABSTRACT

An apparatus for searching for an optimal route based on an entire route includes a Global Positioning System (GPS) module configured to detect a current position of a vehicle, a storage module configured to store digital map data, and a processor. The processor is configured to compute a plurality of candidate routes based on a route search engine on the basis of the current position and the digital map data. The processor is also configured to compute an optimal route by computing estimated time of arrivals (ETAs) of the plurality of candidate routes through an ETA prediction model.

14 Claims, 6 Drawing Sheets

(58) Field of Classification Search
USPC .......................................................... 701/423
See application file for complete search history.

(56) References Cited

U.S. PATENT DOCUMENTS

| | | | | |
|---|---|---|---|---|
| 11,435,199 | B2 * | 9/2022 | Lermusiaux | G01C 21/3469 |
| 2007/0208492 | A1 * | 9/2007 | Downs | G08G 1/0129 |
| | | | | 701/117 |
| 2007/0208497 | A1 * | 9/2007 | Downs | G08G 1/0104 |
| | | | | 701/117 |
| 2007/0208498 | A1 * | 9/2007 | Barker | G08G 1/0969 |
| | | | | 701/117 |
| 2008/0071465 | A1 * | 3/2008 | Chapman | G01C 21/3691 |
| | | | | 701/117 |
| 2014/0172294 | A1 * | 6/2014 | Kalra | G01C 21/3484 |
| | | | | 701/465 |
| 2017/0270790 | A1 * | 9/2017 | Neiger | G08G 1/127 |
| 2017/0337813 | A1 * | 11/2017 | Taylor | G05D 1/0285 |
| 2018/0309592 | A1 * | 10/2018 | Stolfus | H04L 45/22 |
| 2019/0162546 | A1 * | 5/2019 | Duale | G01C 21/3438 |
| 2019/0178667 | A1 * | 6/2019 | Fowe | G01C 21/3694 |
| 2019/0316926 | A1 * | 10/2019 | Wang | G01C 21/3484 |
| 2020/0160268 | A1 * | 5/2020 | Han | G06N 3/0499 |
| 2020/0318981 | A1 * | 10/2020 | Tyuryutikov | G01C 21/20 |
| 2020/0370898 | A1 * | 11/2020 | Patriarca | G01C 21/3667 |
| 2021/0302180 | A1 * | 9/2021 | Kim | G01C 21/3446 |
| 2022/0074751 | A1 * | 3/2022 | Klang | G06N 20/00 |
| 2022/0187847 | A1 * | 6/2022 | Cella | G05B 19/41885 |
| 2022/0276066 | A1 * | 9/2022 | Beaurepaire | G01C 21/3492 |
| 2025/0164261 | A1 * | 5/2025 | Menard | G01C 21/3415 |
| 2025/0173639 | A1 * | 5/2025 | Robinson | G05D 1/6987 |

FOREIGN PATENT DOCUMENTS

| | | | | |
|---|---|---|---|---|
| CN | 119879979 | A * | 4/2025 | G01C 21/3446 |
| CN | 120063300 | A * | 5/2025 | G06Q 10/047 |
| EP | 4563943 | A1 * | 6/2025 | G01C 21/3492 |
| FR | 3150876 | A1 * | 1/2025 | G01C 21/343 |
| JP | 2013113584 | A * | 6/2013 | |
| JP | 2017120230 | A * | 7/2017 | |
| KR | 20120041957 | A | 5/2012 | |
| WO | WO-2004061394 | A1 * | 7/2004 | G08G 1/096741 |
| WO | WO-2021182655 | A1 * | 9/2021 | G06N 3/0499 |
| WO | WO-2024108123 | A1 * | 5/2024 | G08G 1/166 |
| WO | WO-2025032776 | A1 * | 2/2025 | G01C 21/34 |

OTHER PUBLICATIONS

Biyani, et al., "To each route its own ETA: A generative modeling framework for ETA prediction," 2019 IEEE Intelligent Transportation Systems Conference (ITSC), Auckland, New Zealand, 2019, pp. 3076-3081, doi: 10.1109/ITSC.2019.8917465. (https://ieeexplore.ieee.org/document/8917465) (Year: 2019).*

* cited by examiner

FIG.3

```
           MINUTE OF WEEK : 0~2015 (unit of five minutes)
INPUT FEATURES :

- TEMPORAL FEATURES (CATEGORY TYPE)
    • DAY OF WEEK : 0~6
    • MINUTE OF DAY : 0~237 (UNIT OF FIVE MINUTES)
    • MINUTE OF WEEK : 0~2015 (UNIT OF FIVE MINUTES)

- GEOSPATIAL FEATURES
    • TILE ID OF DYNAMIC TILE
      ("DEPARTURE," "DESTINATION,"
      AND "DEPARTURE -DESTINATION")

- TRAFFIC FEATURES (CONTINUOUS TYPE)
    • REAL-TIME SPEED : REAL-TIME PASSING SPEED OF LINK
    • HISTORICAL SPEED : PAST PASSING SPEED OF LINK
                        (BEFORE 5 MINUTES TO 60 MINUTES)

- CONTEXT FEATURES (CATEGORY TYPE)
    • ORIGION CONTEXT ID : DEPARTURE REGION ID
    • DESTINATION CONTEXT ID : DESTINATION REGION ID

- DISTANCE FEATURES (CONTINUOUS TYPE)
    • DISTANCE : ROUTE LENGTH

- LINK FEATURES
    • LINK TYPE : LINK TYPE
    • ROAD TYPE : ROAD TYPE
    • LENGTH : LINK LENGTH

- UGO FEATURES
    • UGO : ACCIDENT INFORMATION
            (ACCIDENT, CONSTRUCTION, EVENT,
            AND GENERAL INFORMATION)

- UGO FEATURES
    • UGO : ACCIDENT INFORMATION
            (ACCIDENT, CONSTRUCTION, EVENT,
            AND GENERAL INFORMATION)

- ROUTING ENGINE FEATURES
    • PREDIC : SPEED (LINK BASED)
               : PASSING TIME OF LINK IN ROUTE SEARCH ENGINE
    • ETA : ETA OF ROUTE SEARCH ENGINE

CORRECT ANSWER :

- LABEL
    • LABEL : ACTUAL DRIVING TIME OF USER
```

APPARATUS FOR SEARCHING FOR AN OPTIMAL ROUTE BASED ON AN ENTIRE ROUTE AND A METHOD THEREOF

CROSS-REFERENCE TO RELATED APPLICATION

This application claims priority to and the benefit of Korean Patent Application No. 10-2022-0182567, filed on Dec. 23, 2022, the entire contents of which are incorporated herein by reference.

TECHNICAL FIELD

The present disclosure relates to an apparatus and a method for searching for an optimal route based on an entire route. More particularly, the present disclosure relates to an apparatus and a method for searching for an optimal route based on an entire route and thus for minimizing information loss of a road network during a route search to calculate a more accurate optimal route.

BACKGROUND

The statements in this section merely provide background information related to the present disclosure and may not constitute prior art.

Recently, because most vehicles are equipped with navigation devices and the number of vehicles increases, vehicle congestion frequently occurs on roads and intersections. Even when driving on a road, which users already know, it is common for the users to perform a route search in advance through a navigation device and receive guidance so that sections, such as roads or intersections where the congestion occurs, can be identified in advance and avoided.

In addition, when searching for a route, the users often use estimated time of arrival (ETA) information. For example, a departure time or appointment time is determined based on the ETA information. Therefore, when the ETA information is not accurate, the user spends an extra time in determining the departure time or appointment time. On the hand, when the ETA information is accurate, the extra time can be reduced so that the user can save a time without wasting a time on the road.

However, conventionally, a road network is divided into cells (or tiles) with the same size, and location information is reflected in learning (i.e., learning of a deep learning model for calculating an ETA. Because the number of road links included in each cell (or tile) varies from a region to another region, there is a lot of information loss in the road network. Thus, there is a problem in that degradation in efficiency occurs due to an increase in the amount of computation for calculating an optimal route.

Thus, by dividing the road network into cells (or tiles) with different sizes based on the number of links included in each cell (or tile) instead of dividing the road network into cells (or tiles) with the same size, there is a need for a method of calculating a more accurate optimal route by minimizing information loss of the road network.

SUMMARY

The present disclosure is directed to an apparatus and a method for searching for an optimal route based on an entire route. The apparatus and the method can minimize information loss of a road network during a route search to calculate a more accurate optimal route.

In an embodiment, an apparatus for searching for an optimal route based on an entire route includes a Global Positioning System (GPS) module configured to detect a current position of a vehicle; a storage module configured to store digital map data; and a processor. The processor is configured to compute a plurality of candidate routes based on a route search engine on the basis of the current position and the digital map data. The processor is also configured to compute an optimal route by computing estimated time of arrivals (ETAs) of the plurality of candidate routes through an ETA prediction model.

In an embodiment of the present disclosure, the ETA prediction model may be a model configured to minimize information loss in a road network and may be an ETA prediction model to which a dynamic tile division method reflecting the number of links in a road is applied.

In an embodiment of the present disclosure, the processor may compute and sort costs of the plurality of candidate routes based on ETA and may compute a candidate route with a lowest cost as the optimal route.

In an embodiment of the present disclosure, the processor may receive geospatial features including identification (ID) information of tiles to which a dynamic tile division method is applied and may perform learning of the ETA prediction model.

In an embodiment of the present disclosure, the processor may set, as a preset value, a maximum number of links capable of being inserted per one tile of a dynamic tile division method. The dynamic tile division method is applied to the ETA prediction model.

In an embodiment of the present disclosure, the processor may insert links of an entire road network one by one into a quadrant tree and may expand the quadrant tree to four quadrants when the number of links inserted into the one tile exceeds the preset value.

In an embodiment of the present disclosure, the expansion of the quadrant tree into the four quadrants may include reduction of one large tile internally into four small tiles.

When the processor continues to expand the quadrant tree and reaches a leaf node where the quadrant tree does not expand any more, the processor may divide and store link information in the leaf node.

In an embodiment, a method of searching for an optimal route based on an entire route includes computing, by a processor, a plurality of candidate routes based on a route search engine. The method may also include computing, by the processor, an optimal route by computing estimated time of arrivals (ETAs) of the plurality of candidate routes through an ETA prediction model.

In an embodiment of the present disclosure, the ETA prediction model may be a model for minimizing information loss in a road network and may be an ETA prediction model to which a dynamic tile division method reflecting the number of links in a road is applied.

In an embodiment of the present disclosure, computing the optimal route may comprise computing and sorting, by the processor, costs of the plurality of candidate routes based on ETA. Computing the optimal route may also comprise computing, the processor, a candidate route with a lowest cost as the optimal route.

In an embodiment of the present disclosure, computing the optimal route may comprise receiving, by the processor, geospatial features including identification (ID) information of tiles to which a dynamic tile division method is applied. Computing the optimal route may also comprise performing, by the processor, learning of the ETA prediction model.

In an embodiment of the present disclosure, the method also comprises setting, as a preset value by the processor, a maximum number of links capable of being inserted into one tile of a dynamic tile division method. The method also comprises applying the dynamic tile division method, to the ETA prediction model.

In an embodiment of the present disclosure, setting the preset value may comprise inserting, by the processor, links of an entire road network one by one into a quadrant tree. Setting the preset value may also comprise expanding, by the processor, the quadrant tree to four quadrants when the number of links inserted into the one tile exceeds the preset value.

In an embodiment of the present disclosure, expanding the quadrant tree into the four quadrants may include reducing one large tile internally into four small tiles.

In an embodiment of the present disclosure, the method also comprises, when the processor continues to expand the quadrant tree and reaches a leaf node where the quadrant tree does not expand any more, dividing and storing link information in the leaf node.

BRIEF DESCRIPTION OF THE DRAWINGS

FIG. 3 is a diagram illustrating input features and correct answers for learning an estimated time of arrival (ETA) prediction model according to the present disclosure.

Figure 1:
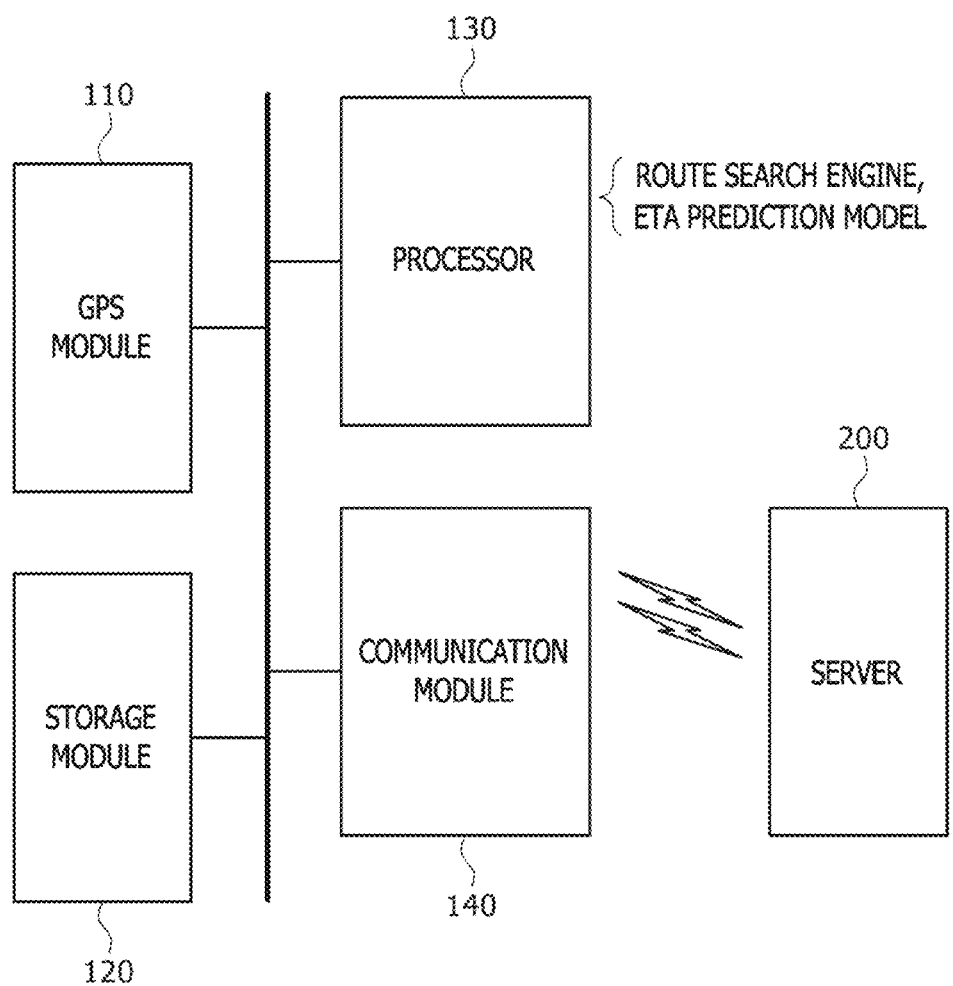
FIG. 1 is a diagram illustrating a schematic configuration of an apparatus for searching for an optimal route based on an entire route according to one embodiment of the present disclosure.

The drawings described herein are for illustration purposes only and are not intended to limit the scope of the present disclosure in any way.

DETAILED DESCRIPTION

Hereinafter, an apparatus and a method for searching for an optimal route based on an entire route are described below with reference to the accompanying drawings through various examples of embodiments.

In the following description, thicknesses of lines and sizes of components shown in the drawings may be exaggerated for clarity and convenience of description. In addition, the terms described below are defined in consideration of the functions of the present disclosure, and these terms may be varied according to the intent or custom of a user or an operator. Therefore, the definitions of the terms used herein should follow contexts disclosed herein.

When a component, device, element, or the like of the present disclosure is described as having a purpose or performing an operation, function, or the like, the component, device, or element should be considered herein as being "configured to" meet that purpose or to perform that operation or function.

The term "unit" or "module" used in the present disclosure signifies one unit that processes at least one function or operation, and may be realized by hardware, software, or a combination thereof. The operations of the method or the functions described in connection with the forms disclosed herein may be embodied directly in a hardware or a software module executed by a processor, or in a combination thereof.

FIG. 1 is a diagram illustrating a schematic configuration of an apparatus for searching for an optimal route based on an entire route according to one embodiment of the present disclosure.

As shown in FIG. 1, the apparatus for searching for an optimal route based on an entire route according to the present embodiment includes a Global Positioning System (GPS) module 110, a storage module 120, a processor 130, and a communication module 140.

The GPS module 110 receives a GPS signal to detect a current position of a vehicle and also receives current position information of a navigation device using a GPS module.

In addition, although not shown in the drawing, the GPS module 110 may receive traffic (traffic volume) information and vehicle traffic volume information for each link, lane information for each road, and traffic situation information (e.g., accident information, event information, construction information, and the like) through a real-time traffic information reception module or the communication module 140.

An internal memory (or database) of the processor 130 stores digital map data (e.g., precision map data, a high definition (HD) map, and the like), and the digital map data includes geographic coordinates indicating latitude and longitude in units of degrees/minutes/seconds.

The storage module 120 may store link information on the basis of the digital map data and may store a traffic information history for each link, which is received through the communication module 140.

The storage module 120 may store a real-time traffic information history for each link in units of seasons, days, and times.

In this case, the storage module 120 may store the real-time traffic information history for each link in the server 200 or may store the real-time traffic information history for a certain period of time (e.g., a designated period of time, that is, one year) by interlocking with the server 200.

Therefore, the information stored in the storage module 120 below should be understood as including the information stored in the server 200.

The processor 130 may learn, for example, perform deep learning, by reflecting the information stored in the storage module 120 (e.g., the real-time traffic information for each link) and information on road properties (e.g., the number of lanes, the presence of signals, the number of turns, collection trajectory, the traffic information history, and the like).

The processor 130 is a concept that includes a route search engine (e.g., a route search algorithm) and an estimated time of arrival (ETA) prediction model (e.g., a deep learning model for ETA prediction).

The processor 130 may compute (calculate) a plurality of candidate routes through the route search engine and compute (calculate) an optimal route among the candidate routes through the ETA prediction model.

The processor 130 may compute a more accurate optimal route when searching for a route, through the ETA prediction model for minimizing information loss of the road network.

The communication module 140 communicates with the server 200 (e.g., an ETA prediction server, a cloud server, a navigation server, and the like).

According to an embodiment of the present embodiment, the apparatus for searching for an optimal route based on an entire route includes a navigation terminal installed in the vehicle and at least one external server 200 connected to the navigation terminal through communication (e.g., a navigation server, a cloud server, an ETA prediction server, and the like).

For example, when connected to the server 200, the apparatus for searching for an optimal route may calculate (compute) a plurality of candidate routes. The apparatus may guide an optimal route (i.e., an optimal candidate route with the lowest cost) among the plurality of candidate routes using one or more pieces of information provided to or from the server 200 (e.g., the real-time traffic information, the ETA prediction information, cost information, and the like).

In some embodiments, the server 200 may be configured to receive a route search request from a navigation terminal installed in the vehicle, calculate an optimal route by reflecting the ETA for the entire route, and then provide the optimal route to the navigation terminal.

In addition, because the server 200 is also equipped with a computing device such as a processor to perform the above route search operation, it can be described that the route search operation is performed by the server 200 or a processor.

Hereinafter, a method in which the processor 130 (or server 200) calculates an optimal route through the route search engine and the ETA prediction model is described with reference to the flowchart of FIG. 2.

Figure 2:
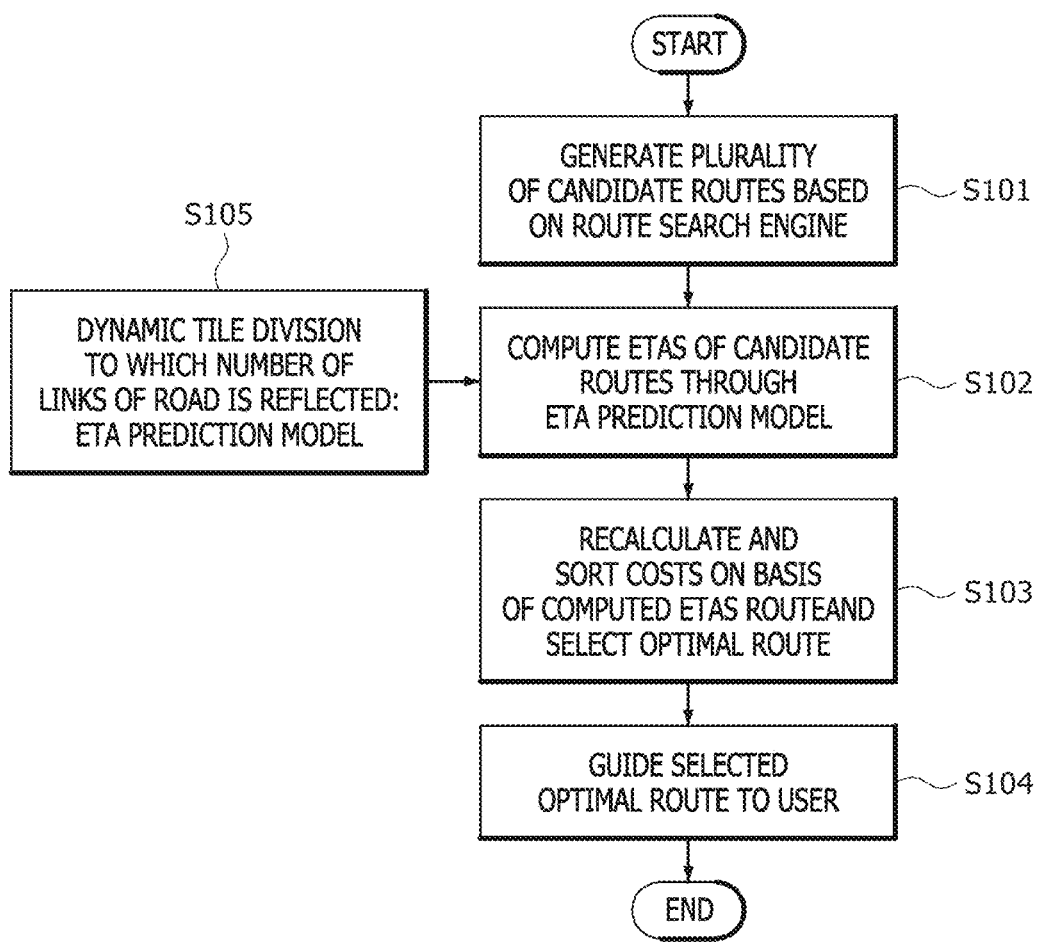
FIG. 2 is a flowchart for describing a method of searching for an optimal route based on an entire route according to one embodiment of the present disclosure.

FIG. 2 is a flowchart for describing a method of searching for an optimal route based on an entire route according to one embodiment of the present disclosure.

Referring to FIG. 2, the processor 130 (or server 200) generates (computes) a plurality of candidate routes based on the route search engine (S101).

The processor 130 (or server 200) computes (calculates) ETAs of the candidate routes through the ETA prediction model (S102).

In this case, the ETA prediction model is an ETA prediction model to which a dynamic tile division method of reflecting the number of links in a road is applied (S105) (see FIGS. 4 and 5) and is a model for minimizing information loss of the road network.

The processor 130 (or server 200) recalculates and sorts costs based on the ETAs of the calculated candidate routes and computes (calculates) a candidate route with the lowest (lowest) cost as the optimal route (S103).

The processor 130 (or server 200) guides the computed (calculated) optimal route to a user (e.g., a navigation user) (S104).

FIG. 3 is a diagram illustrating input features and correct answers for learning an estimated time of arrival (ETA) prediction model according to the present disclosure.

Referring to FIG. 3, the ETA prediction model (e.g., a deep learning model for ETA prediction) according to the present disclosure performs learning by receiving temporal features including temporal information, geospatial features including identification (ID) information of tiles to which the dynamic tile division method is applied, traffic features including information on a passing speed of a link, context features including starting point information and destination information, and distance features including length information on a route. In addition to the above pieces of information, the learning may be performed by receiving more features.

In addition, position information on where each link is positioned is learned, an importance of the link according to a road condition is learned through an attention model (attention matrix), and different weight values are assigned to the input features (i.e., a more weight value is assigned to an important feature).

Figure 4:
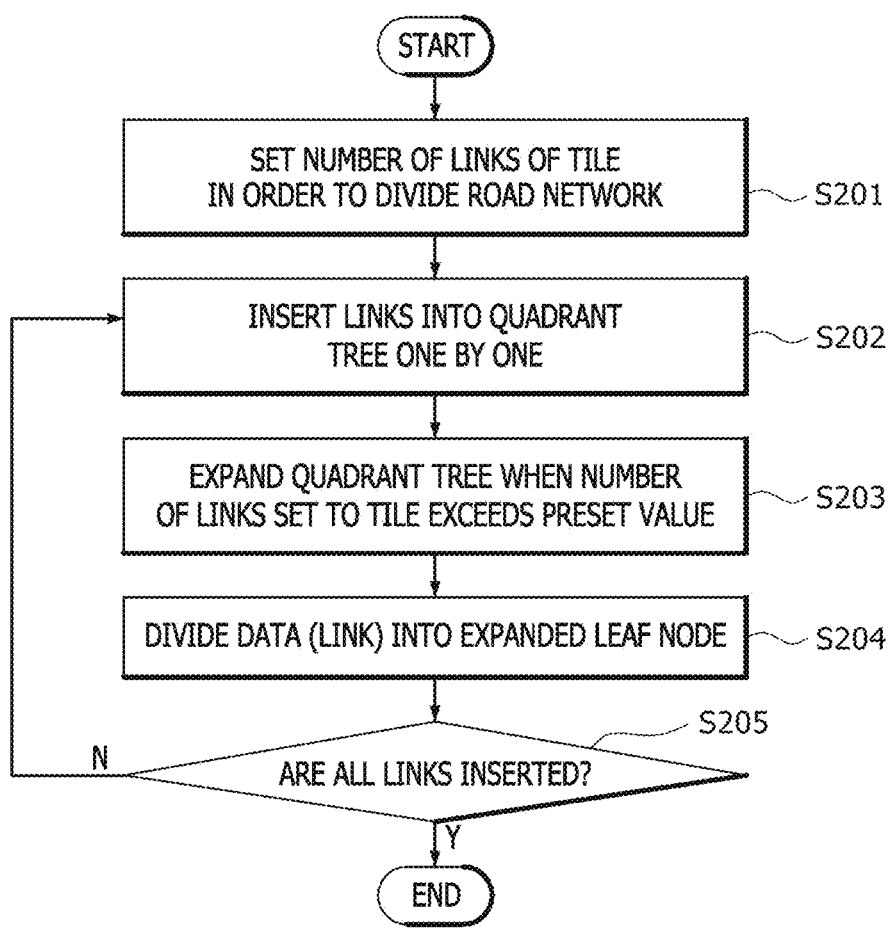
FIG. 4 is a flowchart for describing a dynamic tile division method applied to the ETA prediction model according to one embodiment of the present disclosure.
Figure 5A:
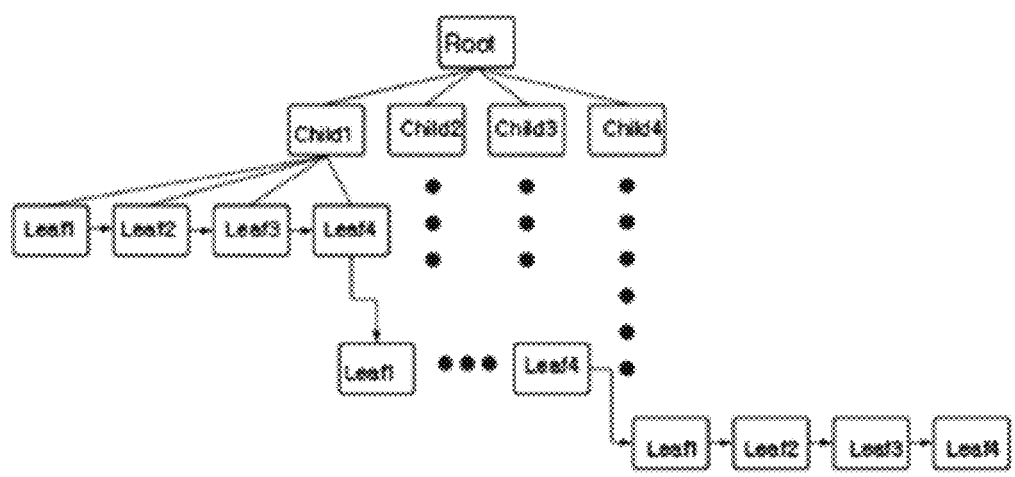
FIGS. 5A, 5B and 5C are diagrams for describing the dynamic tile division method of FIG. 4.
Figure 5B:
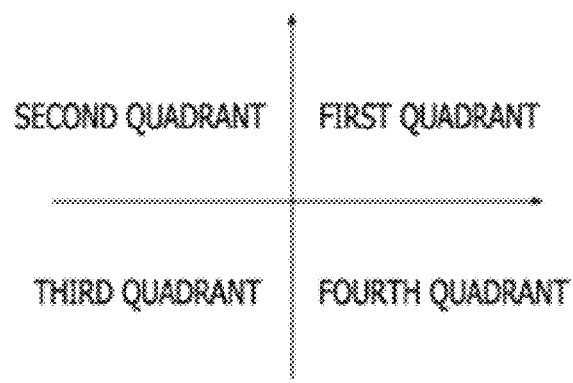
Figure 5C:
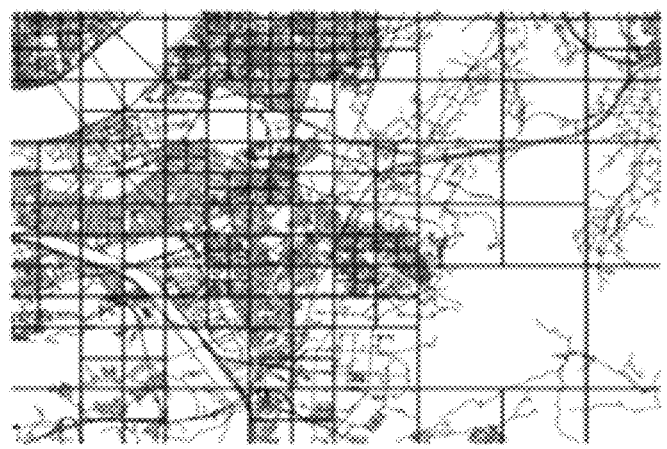

FIG. 4 is a flowchart for describing a dynamic tile division method (i.e., a road network division algorithm) applied to the ETA prediction model according to one embodiment of the present disclosure. FIGS. 5A, 5B and 5C are diagrams for describing the dynamic tile division method (i.e., the road network division algorithm) of FIG. 4.

Referring to FIG. 4, in the dynamic tile division method (i.e., the road network division algorithm), the maximum number of links (e.g., 500), which can be included in each tile (or cell), is set as a preset value (S201).

In this case, the number of links (e.g., 500) set as the preset value is only an example value, and the present disclosure is not limited thereto. It is assumed that the entire country (e.g., the Korean Peninsula) is initially set to one tile coordinate.

Then, the links are inserted one by one into a quadrant tree (S202).

For example, as described above, the links are initially inserted into one tile, which is set across the entire country (e.g., the Korean Peninsula), and when the number of links inserted into the tile exceeds the preset value (e.g., 500), the tree expands to four quadrants (S203) (see FIGS. 5A and 5B).

In this case, the meaning that the tree expands to the four quadrants can be understood as one large tile is internally reduced to four small tiles, as shown in FIG. 5C.

When the tree continues to expand and reaches a leaf node where the tree does not expand any more, data (i.e., the link) is divided into the leaf node (S204).

In other words, referring to FIG. 5C, this means that, when one large tile is internally reduced to four small tiles and finally reduced to the lowest tile, the data (i.e., the link) is divided into the lowest tile.

When all links (e.g., hundreds of thousands of links included in a nationwide road network) are not inserted into the quadrant tree (N of S205), operations S202 to S205 are repeated to insert all the links (e.g., the hundreds of thousands of links included in the nationwide road network) into the quadrant tree.

Referring to FIG. 5C, it can be seen that tiles at positions where links of the road network are concentrated for a region (e.g., the downtown area) are minimally reduced (i.e., the number of links included in the tile is reduced to 500 or less), and tiles at positions where the links of the road network are not concentrated (e.g., a region outside the downtown area) are relatively large in size.

As described above, according to the present disclosure, there is an effect in that, during a route search, information loss of the road network can be minimized to calculate a more accurate optimal route, and the information loss of the road network is minimized so that efficiency can be improved by reducing an amount of computation for calculating the optimal route.

In accordance with the present disclosure, by minimizing information loss of a road network during a route search, a more accurate optimal route can be calculated.

In accordance with the present disclosure, by minimizing the information loss of the road network, efficiency can be improved by reducing an amount of computation for calculating the optimal route.

While the present disclosure has been described with reference to the embodiments shown in the drawings, these are merely illustrative, and those having ordinary skill in the art to which the present disclosure pertains should understood that various modifications and equivalent other embodiments can be implemented within the spirit and scope of the present disclosure. Therefore, the technical scope of the present disclosure should be defined by the appended claims.

What is claimed is:

1. An apparatus for searching for an optimal route based on an entire route, the apparatus comprising:
   a Global Positioning System (GPS) module configured to detect a current position of a vehicle;
   a storage module configured to store digital map data;
   a communication module configured to transmit and receive data with at least one external server; and
   a processor operatively connected to the GPS module, the storage module, and the communication module, the processor comprising:
      a route search engine configured to compute a plurality of candidate routes on the basis of the current position and the digital map data; and
      an Estimated Time of Arrival (ETA) prediction model configured to compute estimated time of arrivals (ETAs) of the plurality of candidate routes, the ETA prediction model being trained based on geospatial features including identification (ID) information of tiles applied with a dynamic tile division method,
   wherein the processor is further configured to compute a cost for each of the plurality of candidate routes based on the computed ETAs and to select an optimal route among the candidate routes based on the cost.

2. The apparatus of claim 1, wherein the ETA prediction model is a model configured to minimize information loss in a road network and is an ETA prediction model to which a dynamic tile division method reflecting the number of links in a road is applied.

3. The apparatus of claim 1, wherein the processor is further configured to:
   compute a candidate route with a lowest cost as the optimal route.

4. The apparatus of claim 1, wherein the processor is further configured to set, as a preset value, a maximum number of links capable of being inserted into one tile of a dynamic tile division method, and
   wherein the dynamic tile division method is applied to the ETA prediction model.

5. The apparatus of claim 4, wherein the processor is further configured to:
   insert links of an entire road network one by one into a quadrant tree; and
   expand the quadrant tree to four quadrants when the number of links inserted into the one tile exceeds the preset value.

6. The apparatus of claim 5, wherein the expansion of the quadrant tree into the four quadrants includes reduction of one large tile internally into four small tiles.

7. The apparatus of claim 5, wherein, when the processor continues to expand the quadrant tree and reaches a leaf node where the quadrant tree does not expand any more, the processor is further configured to divide and store link information in the leaf node.

8. A method of searching for an optimal route based on an entire route, the method comprising:
   computing, by a route search engine of a processor, a plurality of candidate routes on the basis of a current position detected by a Global Positioning System (GPS) module and digital map data stored in a storage module;
   computing, by an Estimated Time of Arrival (ETA) prediction model of the processor, estimated time of arrivals (ETAs) of the plurality of candidate routes, the ETA prediction model being trained based on geospatial features including identification (ID) information of tiles applied with a dynamic tile division method; and
   computing, by the processor a cost for each of the plurality of candidate routes based on the computed ETAs and to select an optimal route among the candidate routes based on the cost.

9. The method of claim 8, wherein the ETA prediction model is a model configured to minimize information loss in a road network and is an ETA prediction model to which a dynamic tile division method reflecting the number of links in a road is applied.

10. The method of claim 8,
    wherein the processor computes a candidate route with a lowest cost as the optimal route.

11. The method of claim 8, further comprising:
    setting, as a preset value by the processor, a maximum number of links capable of being inserted into one tile of a dynamic tile division method; and
    applying the dynamic tile division method to the ETA prediction model.

12. The method of claim 11, wherein setting the preset value comprises:
    inserting, by the processor, links of an entire road network one by one into a quadrant tree; and
    expanding, by the processor, the quadrant tree to four quadrants when the number of links inserted into the one tile exceeds the preset value.

13. The method of claim 12, wherein expanding the quadrant tree into the four quadrants comprises reducing one large tile internally into four small tiles.

14. The method of claim 12, further comprising, when the processor continues to expand the quadrant tree and reaches a leaf node where the quadrant tree does not expand any more, dividing and storing, by the processor link information in the leaf node.

* * * * *